US012802039B2

(12) United States Patent
Pochhi et al.

(10) Patent No.: US 12,802,039 B2
(45) Date of Patent: Nov. 17, 2026

(54) TECHNIQUES FOR AUTOMATIC TASKS IN AN ORGANIZATIONAL MANAGEMENT PLATFORM USING A MACHINE-LEARNED MODEL

(71) Applicant: People Center, Inc., San Francisco, CA (US)

(72) Inventors: Nilay Laxmikant Pochhi, San Francisco, CA (US); Vivin Flawence Peris, San Francisco, CA (US); Kelly Michelle Trinh, San Francisco, CA (US); Lakshya Poddar, Bengaluru (IN); Samarth Sharma, Bengaluru (IN); Sahadeva Hammari, Brooklyn, NY (US); Chad Tolentino, Irvine, CA (US); Prateek Chawla, Vishnu Garden (IN); Vikram Singh Deoelya, San Francisco, CA (US); Ruhitaj Reddypalli, San Francisco, CA (US); Colin King, San Francisco, CA (US)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 19/216,346

(22) Filed: May 22, 2025

(65) Prior Publication Data

US 2026/0268284 A1 Sep. 10, 2026

(30) Foreign Application Priority Data

Mar. 4, 2025 (IN) ............................ 202511019035

(51) Int. Cl.

| | |
|---|---|
| ***G06Q 10/1091*** | (2023.01) |
| ***G06F 9/451*** | (2018.01) |
| ***G06F 40/186*** | (2020.01) |

(52) U.S. Cl.
CPC ......... *G06Q 10/1091* (2013.01); *G06F 9/453* (2018.02); *G06F 40/186* (2020.01)

(58) Field of Classification Search
CPC .... G06Q 10/1091; G06F 9/453; G06F 40/186
(Continued)

(56) References Cited

U.S. PATENT DOCUMENTS 11,494,740 B1 * 11/2022 Buscaglia .......... G06Q 10/1091
2020/0082828 A1 * 3/2020 Malpani .................. G10L 15/26
(Continued)

FOREIGN PATENT DOCUMENTS

CN 118364801 A * 7/2024 ........... G06F 16/334

*Primary Examiner* — Russell S Glass
(74) *Attorney, Agent, or Firm* — Dority & Manning, P.A.

(57) ABSTRACT

Techniques for automatically performing a task in an organizational management platform. For example, a computer system can include a database that collectively store the organizational data associated with the organization. The organizational data can include an object graph data structure comprising a plurality of data objects that respectively correspond to a plurality of entities of the organization. The system can receive, from a user device, a user query requesting a report associated with the organizational data. The system can determine, based on the user query, a first task from a plurality of tasks. The system can process the user query, the first task, and the organizational data to generate a prompt. The system can process, by a machine-learned model, the prompt and the organizational data to generate an output. The system can cause, on a display of a user device, a presentation of the output.

20 Claims, 7 Drawing Sheets

(58) Field of Classification Search
USPC .............................................................. 705/32
See application file for complete search history.

(56) References Cited

U.S. PATENT DOCUMENTS

| | | | | |
|---|---|---|---|---|
| 2023/0237277 | A1* | 7/2023 | Reza ...................... | G06F 40/186 704/9 |
| 2024/0394078 | A1* | 11/2024 | Bonnet ................... | G06F 9/453 |
| 2024/0406166 | A1* | 12/2024 | Bell ........................ | G06N 3/045 |
| 2025/0111157 | A1* | 4/2025 | Tennenholtz ........ | G06N 3/0455 |
| 2025/0209127 | A1* | 6/2025 | Dabbiru ................ | G06F 16/954 |

* cited by examiner

TECHNIQUES FOR AUTOMATIC TASKS IN AN ORGANIZATIONAL MANAGEMENT PLATFORM USING A MACHINE-LEARNED MODEL

CROSS-REFERENCE TO PRIORITY APPLICATION

The present disclosure claims priority to Indian Patent Application number 202511019035, filed Mar. 4, 2025, the entirety of which is incorporated by reference herein.

FIELD

The present disclosure generally relates to using machine-learned models to automate tasks in an organizational management platform. More particularly, the present disclosure relates to training a large language model (LLM) using organizational data and using the LLM to process employee graph object data to automate tasks based on a user request.

BACKGROUND

A large language model (LLM) is a type of artificial intelligence (AI) model that is trained on a large corpus of data to understand and generate content. The LLM can perform various natural language processing tasks such as text generation, text completion, language translation, sentiment analysis, content generation, and summarization. LLMs have demonstrated the ability to understand and generate content across diverse domains and contexts, making them powerful tools for automating language-related tasks and enhancing human-computer interaction.

It is important to note that while LLMs can assist in understanding and processing natural language requests, they may not be proficient in tasks such as data retrieval, processing, and visualization. Integration with other tools and databases specialized in these tasks may be necessary to build a complete system for generating content based on natural language requests.

SUMMARY

Aspects and advantages of embodiments of the present disclosure will be set forth in part in the following description, or can be learned from the description, or can be learned through practice of the embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer system of an organizational management platform. The computer system also includes one or more processors. The system also includes one or more databases that collectively store the organizational data associated with the organization, where the organizational data may include an object graph data structure may include a plurality of data objects that respectively correspond to a plurality of entities of the organization. The system also includes one or more non-transitory computer-readable media that collectively store instructions that, when executed by the one or more processors, cause the computer system to perform operations. The operations may include receiving, from a user device, a user query requesting a report associated with the organizational data. The system also includes determining, based on the user query, a first task from a plurality of tasks. The system also includes processing, the user query, the first task, and the organizational data to generate a prompt. The system also includes processing, by a machine-learned model, the prompt and the organizational data to generate an output. The system also includes causing, on a display of a user device, a presentation of the output. Other embodiments of this aspect include corresponding computer systems, apparatus, and computer programs recorded on one or more computer storage devices, each configured to perform the actions of the methods.

In some instances, the first task can be an action task. The system can determine, based on the first task, a first action from a plurality of actions, each action in the plurality of actions having a predetermined graphical user interface. Additionally, the system can automatically generate, based on the first action, a first graphical user interface; and causing, on a display of the user device, a presentation of the first graphical user interface. In some instances, the system can select, based on the first action, the first graphical user interface from a plurality of template graphical user interface. The plurality of template graphical user interfaces has been previously generated and stored in the one or more databases. The first graphical user interface can be a time and attendance interface. The first graphical user interface can be payroll interface.

In some instances, the first task can be a data retrieval task. The system can process, using the machine-learned model, the prompt and the organizational data to obtain an attribute of a data object from the plurality of objects, where the output is generated based on the attribute. Additionally, the system can process, using the machine-learned model, the prompt and the organizational data to generate a report file based on the attribute. The machine-learned model is trained using the plurality of previously generated report files. In some instances, the system can present the report file on the display of the user device. Additionally, the system can receive user feedback in response to the presentation of the report file. Moreover, the system can process, using the machine-learned model, the user feedback and the report file to generate an updated report file. Subsequently, the system can present an updated report file on the display of the user device.

In some instances, the first task can be a workflow task. The system can process, using the machine-learned model, the prompt and the organizational data to generate a tutorial of a first workflow from a plurality of workflows in the organizational management platform. The tutorial can be a video associated with a plurality of steps in the first workflow. The video is selected from a plurality of previously generated videos.

In some instances, the first task can be determined using a natural language processing model to process the user query. In some instances, the system can receive user feedback in response to the presentation of the output and update one or more parameters of the machine-learned model based on the user feedback.

One general aspect includes a computer-implemented method. The computer-implemented method also includes storing organizational data associated with the organization, where the organizational data may include an object graph data structure may include a plurality of data objects that respectively correspond to a plurality of entities of the organization. The method also includes receiving, from a user device, a user query requesting a report associated with the organizational data. The method also includes determining, based on the user query, a first task from a plurality of tasks. The method also includes processing, the user query, the first task, and the organizational data to generate a prompt. The method also includes processing, by a machine-learned model, the prompt and the organizational data to generate an output. The method also includes causing, on a display of a user device, a presentation of the output. Other embodiments of this aspect include corresponding computer systems, apparatus, and computer programs recorded on one or more computer storage devices, each configured to perform the actions of the methods.

One general aspect includes one or more tangible non-transitory computer-readable media storing computer-readable instructions that. The one or more tangible non-transitory computer-readable media storing computer-readable instructions also includes storing organizational data associated with the organization, where the organizational data may include an object graph data structure may include a plurality of data objects that respectively correspond to a plurality of entities of the organization. The instructions also includes receiving, from a user device, a user query requesting a report associated with the organizational data. The instructions also includes determining, based on the user query, a first task from a plurality of tasks. The instructions also includes processing, the user query, the first task, and the organizational data to generate a prompt. The instructions also includes processing, by a machine-learned model, the prompt and the organizational data to generate an output. The instructions also includes causing, on a display of a user device, a presentation of the output. Other embodiments of this aspect include corresponding computer systems, apparatus, and computer programs recorded on one or more computer storage devices, each configured to perform the actions of the methods.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
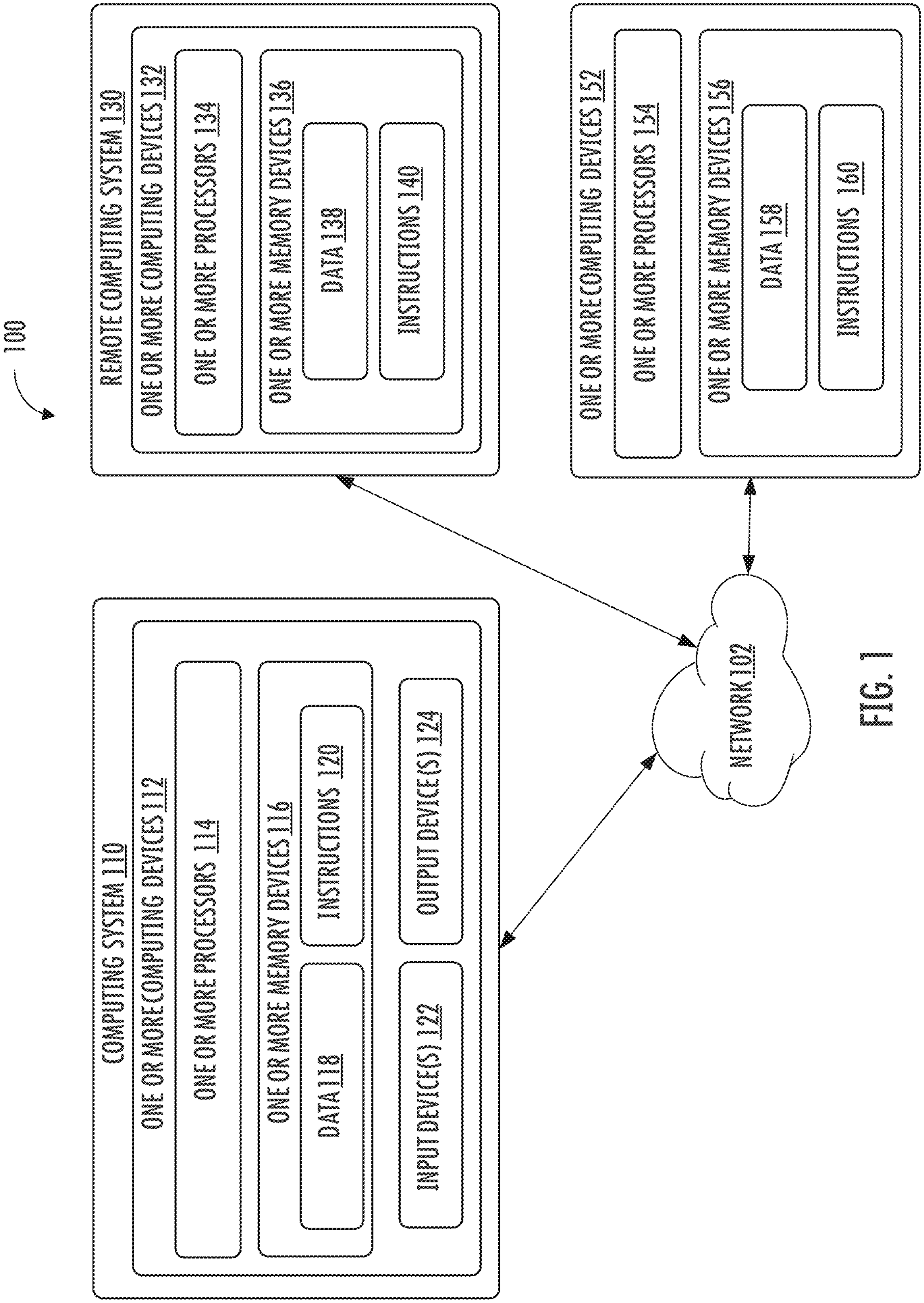
FIG. 1 depicts a block diagram of an example environment including a computing system that performs operations in an organizational management platform, according to example embodiments of the present disclosure.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a further embodiment. Thus, it is intended that aspects of the present disclosure cover such modifications and variations.

Generally, the present disclosure is directed to an intelligent search interface within an organizational management platform that allows users to perform a wide range of tasks through natural language queries. The feature supports automation of workflows, retrieval of organizational data, and navigation through various products available on the organizational management platform. For instance, users can quickly apply for time off, count the number of managers in the organization, or send emails through automated workflows, all by typing a query into the search bar. The system intelligently interprets the user's intent and guides them through the necessary steps, making complex processes accessible and easy to use.

Additionally, the present disclosure is directed to providing improved computer applications, computer systems, computer-implemented methods, user interfaces, and/or services for using machine-learned models to automatically perform tasks with a single action (e.g., input a query in a search box) that would have otherwise required a user to perform multiple operations reports. In particular, examples described in the present disclosure enable automated generation of graphical user interfaces, reports, answers, tutorials, and/or media (e.g., image, graph, video) by processing organizational data of an organization.

The present disclosure provides examples of creating AI-generated output and/or content. In examples of the present disclosure, a computer system may generate and process computer instructions, for example, based on receiving a user request to create the AI-generated content. The system can automatically generate graphical user interfaces using machine-learned models (e.g., large language models). For example, the system can include a natural language interface for a task, where users can input a user query using text and/or speech. The system can generate an action widget based on the user query. The action widget can be generated by processing and analyzing the organization data of an organization.

In some instances, the system can be part of an organization management platform. The organizational management platform can hold, for each of one or more organizations, a centralized set of organizational data that acts as a single, centralized system of record for all organizational management processes for that organization. Each organization can include a number of users who are able to access and interact with the organizational management platform. Some users may have administrative permissions which define whether the user is able to access and/or modify certain types of organizational data for their organization. The AI-generated graphical user interface can be generated for a user based on the specific access of the user.

The organizational data for each organization can include data directly entered into the organizational management platform and/or can include data retrieved, pulled, or otherwise obtained from one or more first party and/or third-party applications with which the organizational management platform may have varying levels of integration. This ingestion and storage of data from third-party applications is in contrast to systems which simply sit on top of third-party applications and apply rules at run time. In some implementations, the organizational management platform can provide a user with the ability to configure the cadence or periodicity at which the organizational management platform receives or ingests data from third-party applications. Data can be transferred between the organizational management platform and third-party applications using various techniques such as application programming interfaces, data hooks, flat files, bulk uploads/downloads and/or other data transfer mechanisms.

The organizational data can, in some implementations, include object graph data. For example, the object graph data of an object can be stored in an object database. Example object classes for the object graph can include employees, devices, job candidates, benefits policies, documents, pay instances, timecards, access rights and/or other objects. For each object, values can be provided and maintained for one or more attributes, such as location, role, salary, and so on. Links can be made between different objects. The object database can be represented as or can store object graph data which can be represented as one or more graphs with nodes that correspond to objects and edges that correspond to links or logical associations between objects and/or object attributes. Graphs can be traversed to understand or leverage relationships among objects and their attributes. In one example, the organizational data can be synthesized into a single graph which includes multiple classes of objects and defines complex relationships among objects and their attributes. For example, all workflows, including payroll, IT, and other workflows can be run through one platform and graph. In some implementations, the employee objects can be referred to and/or treated as sentinel nodes.

In some instances, the system can include a user interface with a search bar that can perform a task based on a natural language query. The system can determine the type of task. The type of task can include an actionable graphical user interface task, a workflow task, or a database retrieval task. The system can generate a prompt based on the type of task. The prompt can be processed by a machine-learned model (e.g., large language model (LLM)) to generate an output. The output can be presented to the user.

For example, a user can input the user query in a main search bar on the user interface of the organizational management platform. The main search bar can be positioned at the top of the user interface.

One example of a task can be an actionable task. The actionable task can include clocking in, clocking out, taking paid time off, or any other actionable task that can be performed on the organizational management platform. For these actionable tasks, the system can automatically present a specific graphical user interface for the user to perform the action without the user needing to navigate the different tools and products in the organizational management platform to get to this specific graphical user interface.

Continuing with the actionable task, the system can generate an action widget from a plurality of action widgets based on a user request by using a machine-learned model to process the organizational data. The system can perform natural language processing techniques to understand the user request. The system can extract key information such as a type of widget requested, output data to be visualized, input data to be processed, a desired format for the report, and any specific parameters or filters. The system can include a natural language interface for widget generation. The system can use a natural language interface for users to input their queries. Users can input text or speech, which is interpreted by the system and used to output an action widget so that the users can perform an action in the platform. The ability to input queries in natural language simplifies the user experience significantly. The system can generate a prompt for the machine-learned model based on the user input.

Continuing with the actionable task example, in the clock-in example, the user may want to easily clock-in by putting in a query in the search bar to "clock-in." In response, the system can automatically present a graphical user interface (e.g., a clock-in widget) that allows the user to clock-in without the user having to navigate the platform to find the clock-in widget. The system can retrieve the organizational data to be processed to generate the graphical user interface. The organizational data can be stored a database of the organizational management platform. In some instances, the system can query the database based on the parameters extracted and/or generated from the user request. Moreover, the system can analyze and process the retrieved data to determine the parameters (e.g., for a pull-down menu) to include in graphical user interface.

Another example of a task can be a data retrieval task. For example, a user may want ask a question (e.g., how many managers are in the company, how many employees live in a certain area, how many applications are available on the platform, what applications are installed on my computer, how many hardware devices are installed). For the data retrieval tasks, a user can simply ask a question in the search bar, and the system can provide an answer based on the organizational data and/or other data derived from the organizational management platform.

Continuing with the data retrieval task, the system can retrieve the organizational data to be processed to generate an answer and/or report. The organizational data can be stored a database of the organizational management platform. In some instances, the system can query the database based on the parameters extracted and/or generated from the user request. Moreover, the system can analyze and process the retrieved data to determine the answer and/or to generate a report. For example, the system can clean the data, aggregate the data, perform calculations, and/or applying statistical analysis as needed. Subsequently the system can generate the report. In some instances, the report can include a chart. The chart can be generated using charting libraries to generate the desired chart based on the processed data. The type of chart generated can be based on the user request, and the type of the data being visualized. Common types of charts include bar charts, line charts, pie charts, scatter plots.

In some instances, after generating the report, the system can formulate a natural language response to the user that includes the chart itself along with any relevant insights or explanations. This response is generated in a way that is understandable and informative to the user.

In some instances, the system can prevent hallucinations. For example, the system can perform a correction of hallucinated output (e.g., report, chart types, and attributes). The system can have a mechanism to correct hallucinated chart types and attributes. In some instances, based on a comparison with the previously generated report file, the system can update one or more parameters of the AI-generated report file. For example, the system can return the string closest to a given input from a list of string choices in the system.

According to some embodiments, the system includes a data visualization and reporting dashboard. The system can include a feature to watermark content that is AI-generated, to help distinguish between human-generated and AI generated content. In other examples, the user request can generate predefined reports, policies, triggering, data management, and/or workflows. These predefined items can be visible and modifiable by the user (e.g., in raw query expression form or via a wizard user interface). For example, in the wizard user interface, objects or functions can be automatically populated and/or suggested.

In some instances, the system can include a user feedback loop. The system can update the AI-generated report based on the user feedback. Additionally, the machine-learned models can be updated based on user feedback to the AI-generated reports. For example, one or more parameters of the machine-learned models can be modified based on the user feedback. By incorporating a process for feedback from the user, the system can improve the accuracy and relevance of future report generations. Additionally, the system can provide, using a graphical user interface, options for refining the generated chart based on the user feedback.

Yet another example of a task can be a workflow task. The workflow task can include tutorials of how to navigate different tools and products within the organizational management platform. For example, a user may want to send an email to manager via workflow, and the system can provide a step-by-step tutorial with a demonstration and can highlight particular elements on interest that is custom-tailored to the specific user.

For example, an organization can generally use many applications and systems to sustain operations. Such applications and systems can be integrated with organizational data of the organization that is managed by the organizational management platform as the centralized system of record. In addition, such applications and systems can process the organizational data and usually are written by computer programmers in complex programming languages, utilize sophisticated data models with large numbers of entities and relationships. However, most users that work with organizational data lack the specialized knowledge, experience, and skills to build and maintain applications and systems that utilize organizational data. As such, with the workflow task example, the system can empower users with the ability to easily access, query, obtain, and perform various actions with organizational data and other types of information available in an organizational management platform.

The systems, methods, and computer program products described herein provide a number of technical effects and benefits. As one example, the embodiments described in the present disclosure provide automated generation and processing of computer instructions for use across a variety of applications and systems that utilize different underlying technologies and technical designs, for example, more efficiently and with fewer computing resources (e.g., less processing power, less memory usage, less power consumption), that would otherwise be wasted by maintaining custom, proprietary, and/or manual processes. In particular, examples of the present disclosure automate the generation and processing of computer instructions across different applications and systems using a rigorous computerized process.

With reference to the Figures, example embodiments of the present disclosure will be discussed in further detail.

FIG. 1 depicts a block diagram of an example environment 100 including a computing system 110 that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, 152) via the network 102. The computing system 110 may operate in various different configurations including as a server or a client machine in a client-server network environment, or as a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, an FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein including, for example, one or more operations associated generating a report based a user request. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include receiving a request to generate a report, process the request and organization data to generate a prompt, process the prompt to generate a first report configuration file, and generate the report based on the first report configuration file.

The data 118 can include organizational data (e.g., organizational data that can include one or more organizational records), one or more data structures defining, describing, and/or otherwise associated with the organizational data, rule data (e.g., one or more rules maintained by an organizational data management system), access rights data, application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices), and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with performing multilayered generation and processing of computer instructions) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications comprising computer instructions, machine-learned models) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, and/or other types of data.

Furthermore, the example environment can include one or more computing devices 152 (e.g., user devices or any other types of devices) having one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications comprising computer instructions, machine-learned models) that can be stored and/or executed by such one or more computing devices 152. Further, the one or more applications can include one or more third-party applications that may be accessed from the one or more computing devices 152 and which are at least partly operated from such one or more computing devices 152. Data 138 may include, for example, one or more portions of the organizational data (e.g., one or more organizational records), one or more data structures associated with the organizational data, rule data, organizational policy data, application policy data, third-party integration data (e.g., third-party application integration data), and/or other types of data.

Figure 2:
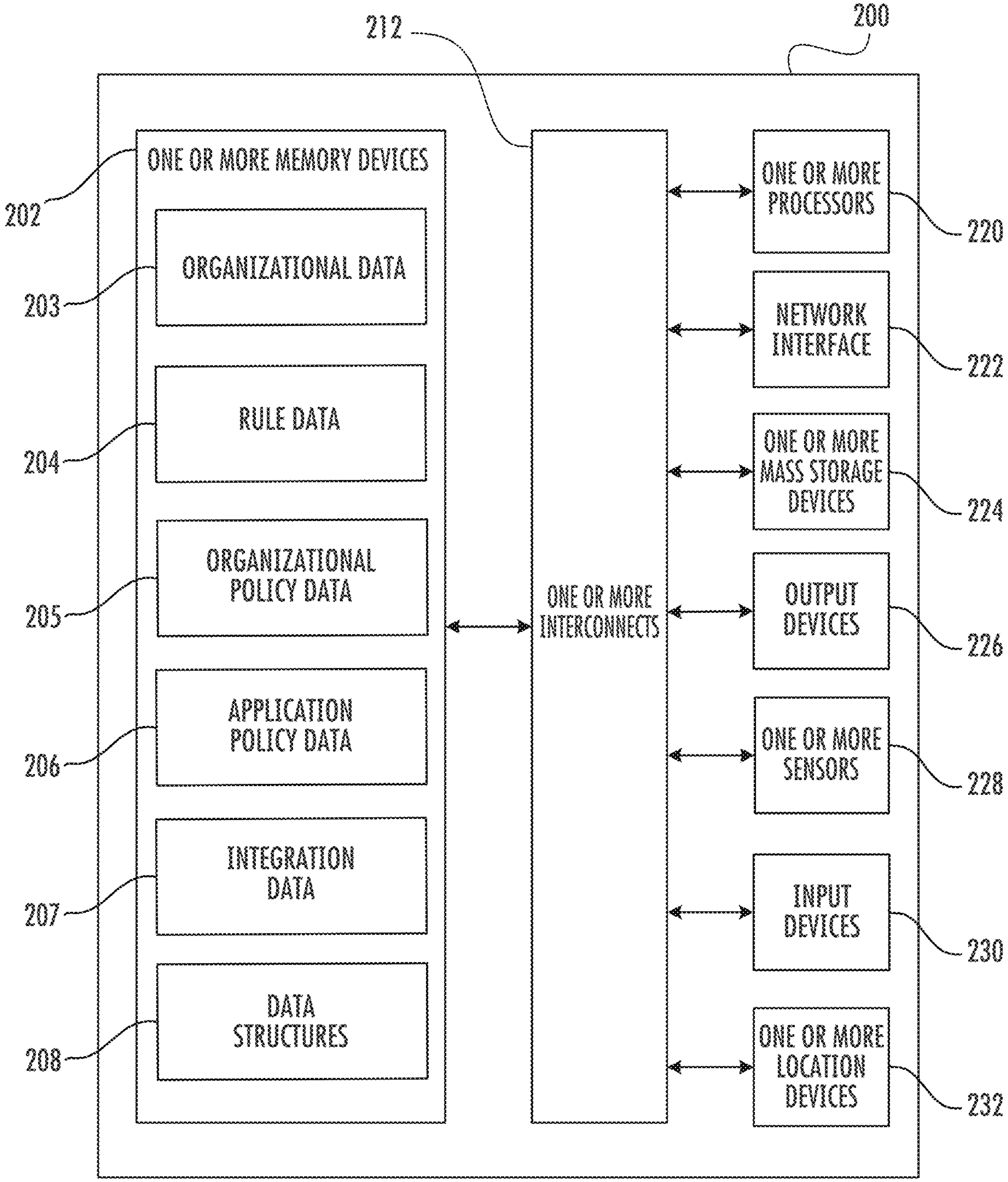
FIG. 2 depicts a block diagram of an example of a computing device, according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, machine-learned model 205, report configuration file data 206, integration data 207, data structures 208, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, machine-learned model 205, report configuration file data 206, integration data 207, data structures 208, and/or any other types of data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations associated with generating a report.

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1) which can include one or more computing systems that are remote (e.g., in another room, building, part of town, city, or nation) from the computing device 200.

The rule data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The rule data 204 can include information associated with one or more rules that can be used to generate a report, such as access right to specific information in the organization data for a specific user. For example, salary information may be restricted to some users, and therefore a user request for salary information may be limited to information that access rights of that user. The rule data 204 also can include information associated with one or more rules of an organizational data management system (e.g., base or default rules provided or enforced by the system, one or more custom rules configured by an organization). In some embodiments, the rule data 204 can be received from one or more computing systems (e.g., the remote computing system 130 depicted in FIG. 1), which can include one or more computing systems that are remote from the computing device 200.

The machine-learned model(s) 205 can include or more machine-learned models. For example, a natural language processing model can process a user query and organization data (e.g., employee data objects) to generate a prompt. Additionally, a machine-learned model can process the prompt and the organizational data to generate a first report configuration file. The system can generate the report for the user query based on the first report configuration file. The machine-learned model(s) 205 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively.

In some embodiments, the machine-learned model(s) can be stored in the remote computing system (e.g., the remote computing system 130 depicted in FIG. 1) which can include one or more computing systems that are remote from the computing device 200.

The report configuration file data 206 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the report configuration file data 206 can include previously generated report configuration files by users of organizational management platform. In some embodiments, the report configuration file data 206 can be received from one or more computing systems (e.g., the remote computing system 130 depicted in FIG. 1) which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The integration data 207 can include configuration and/or operational information associated with integrating and synchronizing data (e.g., organizational data

203) among one or more applications. For example, the integration data 207 can include information that enables integration and synchronization between each of one or more applications (e.g., third-party applications and/or other applications). In an embodiment, the integration data 207 provides integration information that allows an organizational data management system (e.g., a system of record for organizational data and organizational data processing), for example, to obtain information from one or more applications (e.g., third party and/or other applications), to perform operations involving organizational data (e.g., organizational data 203) in the organizational data management system, to synchronize organizational data across one or more applications, to perform one or more actions involving the applications based on organizational data in the organizational data management system, and/or to perform one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The data structures 208 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships. The data structures 208 can be implemented and utilized with one or more types of computer software, computer hardware, or any combination thereof. In an embodiment, the data structures 208 are used to represent and perform processing associated with various types of organizational data (e.g., organizational data 203). For example, the data structures 208 may include information about various types of information and entities associated with organizational data including, but not limited to, individuals (e.g., employees, vendors, independent contractors), departments, teams, roles, groups, locations, offices, documents, tasks, reports, accounts, devices, applications, end-user applications, licenses, workflows, alerts, and/or any other types of entities representing or related to managing organizational data (e.g., organizational data 203).

The data structures 208 also can define various relationships among the various entities associated with organizational data. For example, the data structures 208 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data 203 based on one or more organizational data management applications).

In some embodiments, the data structures 208 can include one or more object graphs providing information about entities, relationships, and/or any other aspects relating to the definition, structure, and rules associated with organizational data (e.g., organizational data 203). The data structures 208 also can include any one or more other types of data structures (e.g., with or without the use of object graphs) that provide information about entities, relationships, and/or any other aspects of the definition, structure, and/or rules associated with organizational data. In some embodiments, the data structures 208 can be received from one or more computing systems (e.g., the remote computing system 130 depicted in FIG. 1), which can include one or more computing systems that are remote from the computing device 200.

The one or more interconnects 212 can include one or more interconnects or buses that can be used to send and/or receive one or more signals (e.g., electronic signals) and/or data (e.g., organizational data 203, rule data 204, machine-learned models 205, report configuration file data 206, integration data 207, data structures 208, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (Fire Wire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 203, the rule data 204, the machine-learned models 205, the report configuration file data 206, the integration data 207, the data structures 208, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the rule data 204, the machine-learned models 205, the report configuration file data 206, the integration data 207, the data structures 208, and/or any other data. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system, a dead reckoning system, based on IP address, by using triangulation and/or proximity to cellular towers or Wi-Fi hotspots, and/or beacons.

Figure 3:
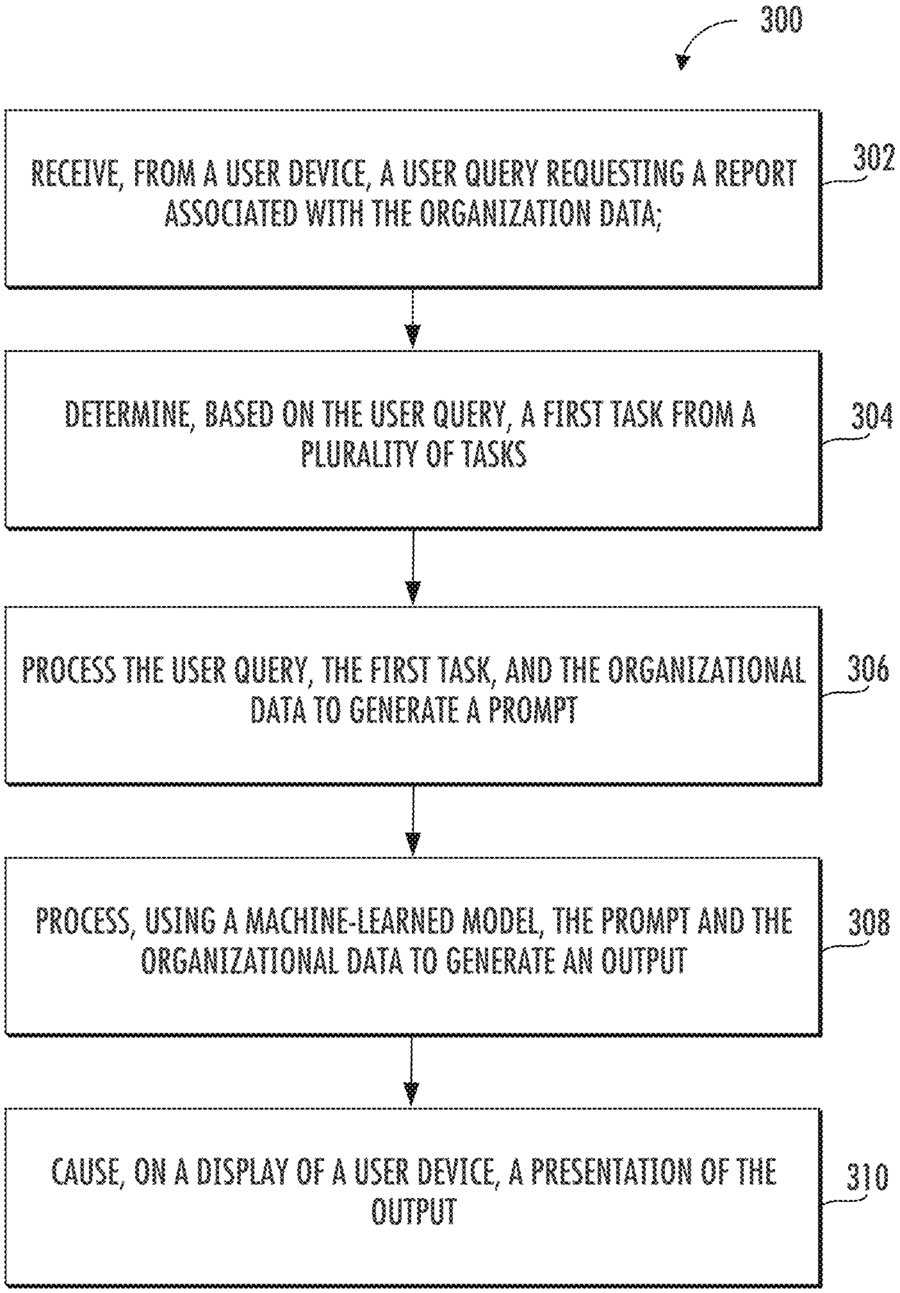
FIG. 3 depicts flow chart diagram of an example method for automatically performing a task in an organizational management platform, according to example embodiments of the present disclosure.

FIG. 3 depicts a flow diagram of an example method 300 for perform a task in an organizational management platform, according to example embodiments of the present disclosure. One or more portions of the method 300 can be executed and/or implemented on one or more computing devices or computing systems including, for example, the computing system 110, the remote computing system 130, the one or more computing devices 152, the computing device 200. In addition, one or more portions of the method 300 can be executed or implemented as an algorithm on the hardware devices or systems disclosed herein. FIG. 3 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

According to some embodiments, a computer system can automatically generate an output based on organizational data of an organization. The computer system can include one or more processors and one or more databases. The databases can collectively store the organizational data associated with the organization. The organizational data can include a plurality of employee data objects that respectively correspond to a plurality of employees of the organization and a plurality of previously generated graphical user interfaces, reports, and/or workflow tutorials. Additionally, the databases can include a machine-learned model. The machine-learned model can be configured to generate an output based on a prompt.

At 302, a system (e.g., computer system) can receive, from a user device, a user query requesting a report associated with the organizational data.

At 304, the system can determine, based on the user query, a first task from a plurality of tasks. In some instances, the first task is determined using a natural language processing model to process the user query.

At 306, the system can process the user query, the first task, and the organizational data to generate a prompt. For example, the natural language processing model can generate a prompt to input into the machine-learned model at 308. The prompt can be generated based on the user query and the organizational data 203. The organizational data 204 can include employee data objects. In one example, when the first task is a data retrieval task, the prompt can be "total headcount of employees in the engineering department."

At 308, the system can process, using a machine-learned model (e.g., machine-learned model 205), the prompt and the organizational data to generate an output. The machine-learned model 205 can be trained by using previous actions that were taken by users of the organization management platform.

At 310, the system can cause, on a display of a user device, a presentation of the output.

In some instances, the system can receive user feedback in response to the presentation of the output. Additionally, the system can update one or more parameters of the machine-learned model based on the user feedback.

According to some embodiments, the first task can be an action task. The system can determine, based on the first task, a first action from a plurality of actions. Each action in the plurality of actions can have a predetermined graphical user interface. Additionally, the system can automatically generate, based on the first action, a first graphical user interface. Furthermore, the system can cause, on a display of the user device, a presentation of the first graphical user interface.

In some instances, the system can select, based on the first action, the first graphical user interface from a plurality of template graphical user interface. The plurality of template graphical user interfaces can be previously generated and stored in the one or more databases. For example, the first graphical user interface (e.g., action widget) can be a time and attendance interface. In another example, the first graphical user interface can be payroll interface.

According to other embodiments, the first task can be a data retrieval task. The system can process, using the machine-learned model, the prompt and the organizational data to obtain an attribute of a data object from the plurality of objects, wherein the output is generated based on the attribute.

In some instances, the system can process, using the machine-learned model, the prompt and the organizational data to generate a report file based on the attribute. The machine-learned model can be trained using the plurality of previously generated report files.

In some instances, the system can present the report file on the display of the user device. Additionally, the system can receive user feedback in response to the presentation of the report file. Moreover, the system can process, using the machine-learned model, the user feedback and the report file to generate an updated report file. Subsequently, the system can present an updated report file on the display of the user device.

According to some other embodiments, the first task can be a workflow task. The system can process, by the machine-learned model, the prompt and the organizational data to generate a tutorial of a first workflow from a plurality of workflows in the organizational management platform. For example, the tutorial can be a video associated with a plurality of steps in the first workflow. The video can be selected from a plurality of previously generated videos.

Figure 4:
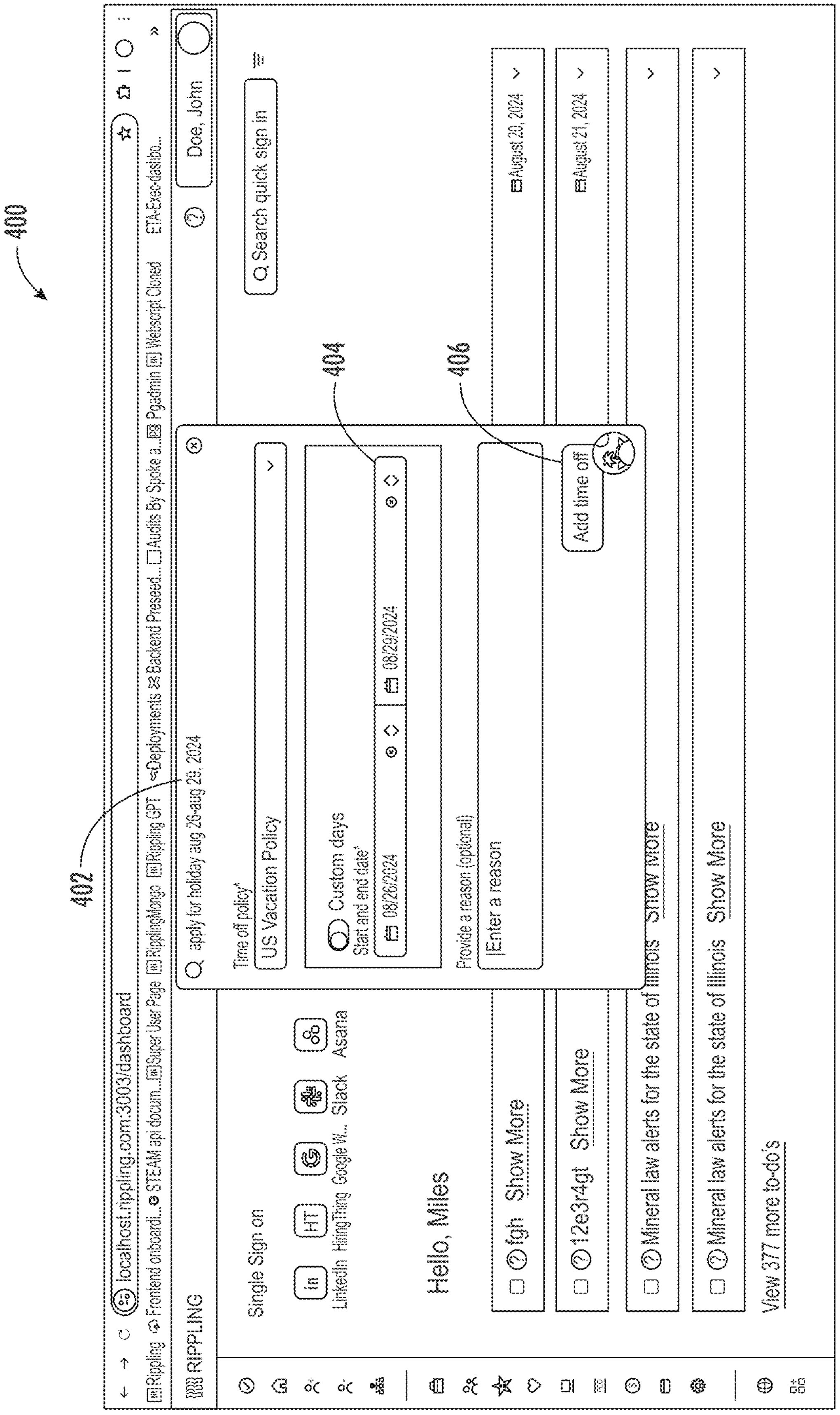
FIG. 4 illustrates an illustration of a graphical user interface that is automatically generated based on a user query that is an action task, according to example embodiments of the present disclosure.

FIG. 4 illustrates an illustration 400 of an action task example. In this example, the user can input a query 402 (e.g., "apply for holiday") in the search box. The system can present a first graphical user interface 404 to enable the user to perform the task. The first graphical user interface 404 can be AI-generated chart based on a user query according to example embodiments of the present disclosure. The user can perform the task by inputting data and clicking an action button 406. As a result, the database can be updated.

Figure 5:
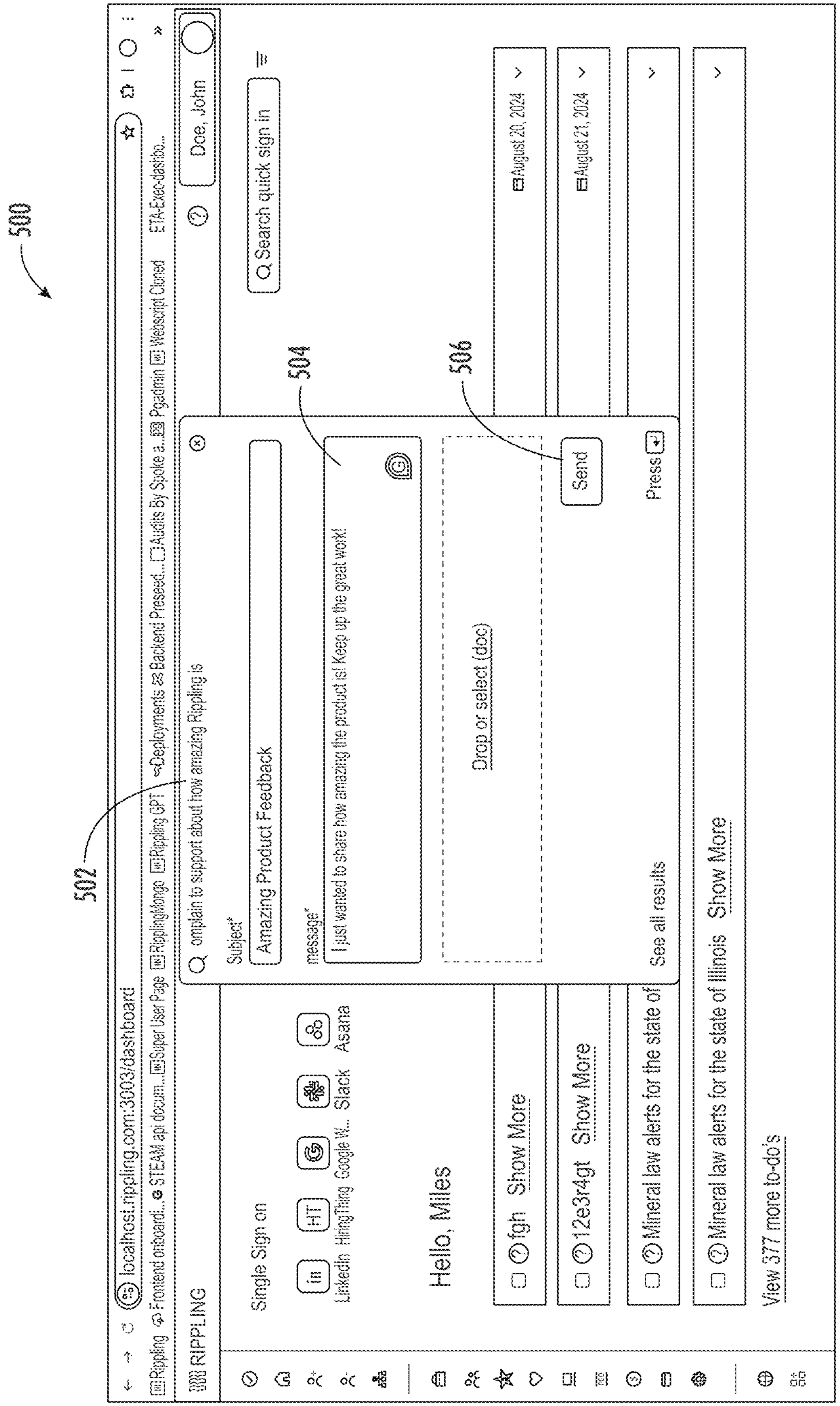
FIG. 5 illustrates an illustration of another graphical user interface that is automatically generated based on a user query that is an action task, according to example embodiments of the present disclosure.

FIG. 5 illustrates an illustration 500 of another action task example. In this example, the user can provide feedback by typing in a query 502 (e.g., "feedback") in the search box. The system can present a second graphical user interface 504 to enable the user to perform the task. The second graphical user interface 504 can be AI-generated chart based on a user query according to example embodiments of the present disclosure. The user can perform the task by inputting data and pressing an action button 506. As a result, the feedback can be sent to an entity.

Figure 6:
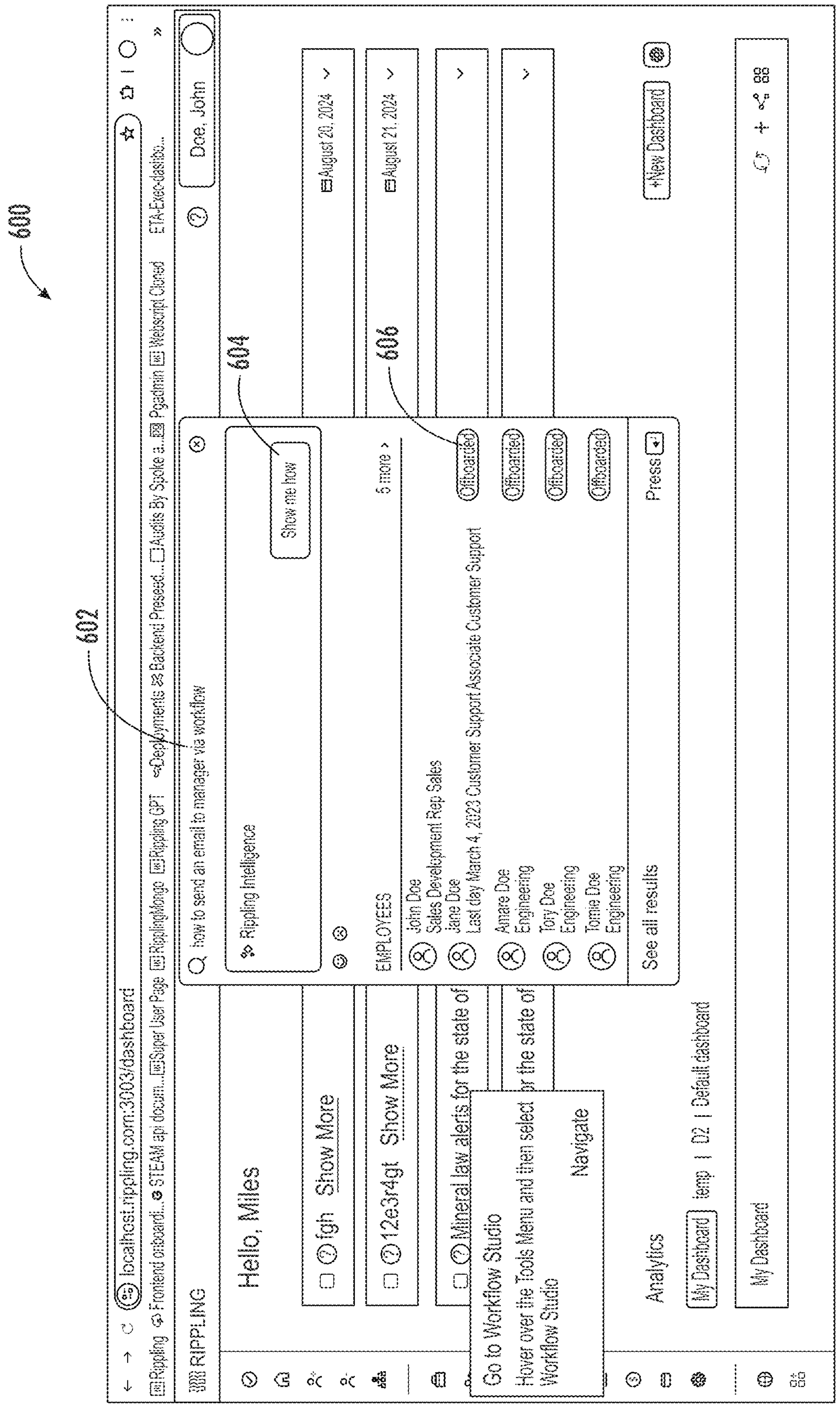
FIG. 6 illustrates an illustration of a graphical user interface for a user query that is a workflow task, according to example embodiments of the present disclosure.

FIG. 6 illustrates an illustration 600 of workflow task example. In this example, the user can input a workflow-related query 602 (e.g., how to send an email to a manager via workflow") in the search box. The system can present clickable button 604 that can provide a tutorial of how to perform a specific workflow task in the platform. Additionally, in some instances, the system can provide additional information 606 that are related to this workflow task.

Figure 7:
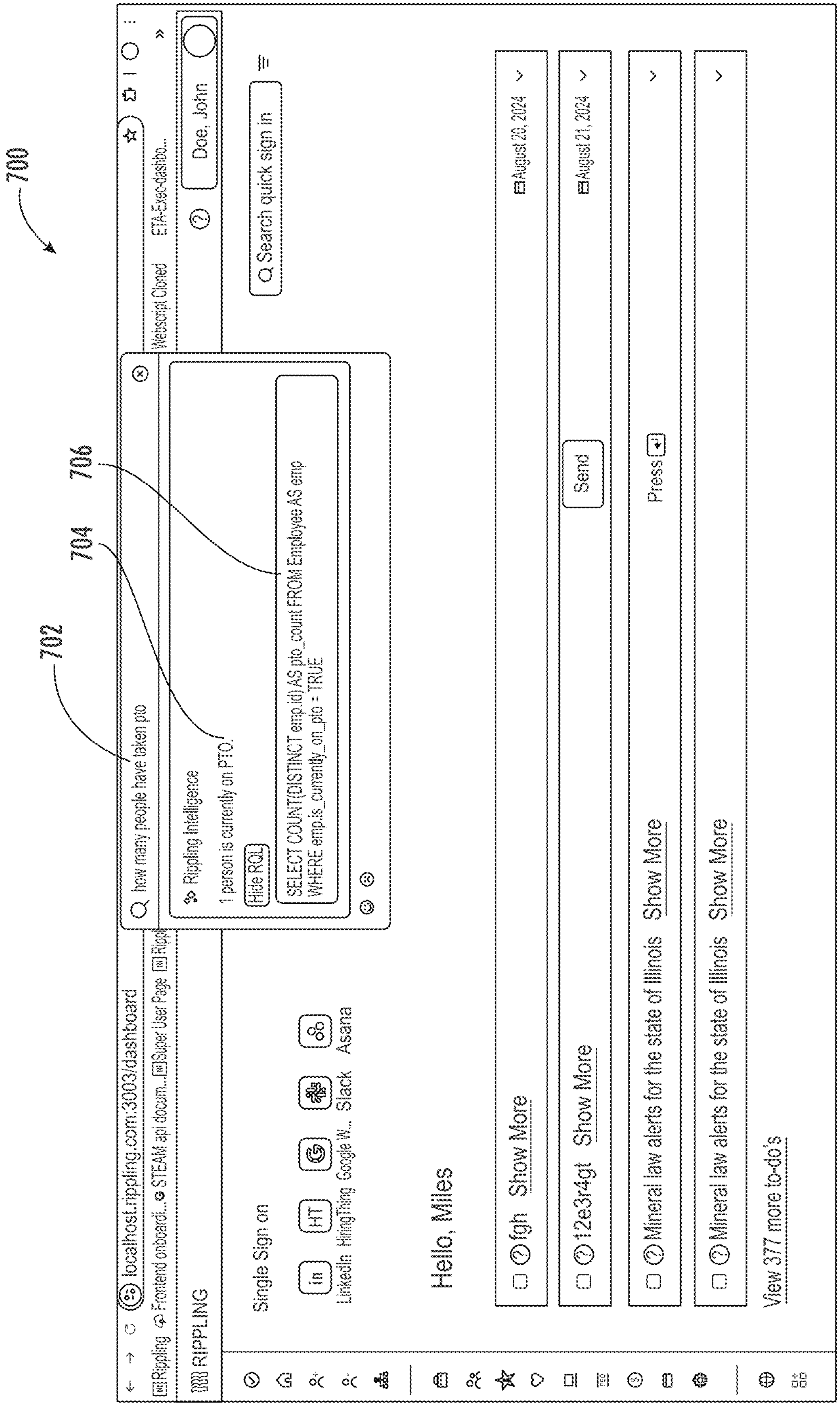
FIG. 7 illustrates an illustration of a graphical user interface for a user query that is a data retrieval task, according to example embodiments of the present disclosure.

FIG. 7 illustrates an illustration 700 of a data retrieval task example. In this example, the user can provide ask a question by typing in a query 702 (e.g., "how many people have taken time off") in the search box. The system can present the answer 704 and provide the code 706 (e.g., SQL, custom code) that was utilized to obtain the answer.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system of an organizational management platform, the computer system comprising:

one or more processors; and one or more databases that collectively store organizational data associated with the organization, wherein the organizational data comprises an object graph data structure comprising a plurality of data objects that respectively correspond to a plurality of entities of the organization; and one or more non-transitory computer-readable media that collectively store instructions that, when executed by the one or more processors, cause the computer system to perform operations, the operations comprising:

receiving, from a user device, a user query to perform a task associated with the organizational data;

determining, based on the user query, a first task from a plurality of tasks;

determining, based on the first task, a clock-in action from a plurality of actions;

processing, the user query, the first task, and the organizational data to generate a prompt;

processing, using a machine-learning model, the prompt and the organizational data to generate an artificial intelligence (AI) generated output;

detecting a hallucinated element within the AI-generated output by comparing an AI-generated attribute of the AI-generated output with a previously generated report;

identifying, from a list of string choices in the computer system, a valid system string that represents a closest string match to the hallucinated element;

updating a parameter of the AI generated output based on the valid system string;

generating, based on the clock-in action and the updated parameter of the AI generated output, a first graphical user interface comprising a clock-in widget;

causing, on a display of a user device, a presentation of the AI generated output.

2. The system of claim 1, the operations further comprising: receiving, in the first graphical user interface, user input associated with the first task; and updating the organizational data based on the user input.

3. The system of claim 1, the operations further comprising: selecting, based on the first action, the first graphical user interface from a plurality of template graphical user interface.

4. The system of claim 3, wherein the plurality of template graphical user interfaces has been previously generated and stored in the one or more databases.

5. The system of claim 1, wherein the first graphical user interface is a time and attendance interface.

6. The system of claim 1, wherein the first graphical user interface is payroll interface.

7. The system of claim 1, wherein the first task is a data retrieval task, the operations further comprising:

processing, using the machine-learning model, the prompt and the organizational data to obtain an attribute of a data object from the plurality of objects, wherein the output is generated based on the attribute.

8. The system of claim 7, the operations further comprises:

presenting computer language code associated with how the output was generated.

9. The system of claim 7, the operations further comprises:

processing, using the machine-learning model, the prompt and the organizational data to generate a report file based on the attribute.

10. The system of claim 9, wherein the machine-learning model is trained using the plurality of previously generated report files.

11. The system of claim 9, wherein the operations further comprise:

presenting the report file on the display of the user device;

receiving user feedback in response to the presentation of the report file;

processing, using the machine-learning model, the user feedback and the report file to generate an updated report file; and presenting an updated report file on the display of the user device.

12. The system of claim 1, wherein the operations further comprise:

receiving user feedback in response to the presentation of the output; and updating one or more parameters of the machine-learning model based on the user feedback.

13. The system of claim 1, wherein the first task is determined using a natural language processing model to process the user query.

14. The system of claim 1, wherein the first task is a workflow task, the operations further comprising:

processing, using the machine-learning model, the prompt and the organizational data to generate a tutorial of a first workflow from a plurality of workflows in the organizational management platform.

15. The system of claim 14, wherein the tutorial is a video associated with a plurality of steps in the first workflow.

16. The system of claim 1, wherein the video is selected from a plurality of previously generated videos.

17. A computer-implemented method, comprising:

storing organizational data associated with the organization, wherein the organizational data comprises an object graph data structure comprising a plurality of data objects that respectively correspond to a plurality of entities of the organization;

receiving, from a user device, a user query to perform a task associated with the organizational data;

determining, based on the user query, a first task from a plurality of tasks;

determining, based on the first task, a clock-in action from a plurality of actions;

processing, the user query, the first task, and the organizational data to generate a prompt;

processing, using a machine-learning model, the prompt and the organizational data to generate an artificial intelligence (AI) generated output;

detecting a hallucinated element within the AI-generated output by comparing an AI-generated attribute of the AI-generated output with a previously generated report;

identifying, from a list of string choices in the computer system, a valid system string that represents a closest string match to the hallucinated element;

updating a parameter of the AI generated output based on the valid system string;

generating, based on the clock-in action and the updated parameter of the AI generated output, a first graphical user interface comprising a clock-in widget; and causing, on a display of a user device, a presentation of the AI generated output.

18. One or more tangible non-transitory computer-readable media storing computer-readable instructions that, when executed by one or more processors, cause the one or more processors to:

storing organizational data associated with the organization, wherein the organizational data comprises an object graph data structure comprising a plurality of data objects that respectively correspond to a plurality of entities of the organization;

receiving, from a user device, a user query to perform a task associated with the organizational data;

determining, based on the user query, a first task from a plurality of tasks;

determining, based on the first task, a clock-in action from a plurality of actions;

processing, the user query, the first task, and the organizational data to generate a prompt;

processing, using a machine-learning model, the prompt and the organizational data to generate an artificial intelligence (AI) generated output;

detecting a hallucinated element within the AI-generated output by comparing an AI-generated attribute of the AI-generated output with a previously generated report;

identifying, from a list of string choices in the computer system, a valid system string that represents a closest string match to the hallucinated element;

updating a parameter of the AI generated output based on the valid system string;

generating, based on the clock-in action and the updated parameter of the AI generated output, a first graphical user interface comprising a clock-in widget; and causing, on a display of a user device, a presentation of the AI generated output.

19. The system of claim 1, the operations further comprise:

updating the AI generated report based on user feedback;

updating one or more parameters of the machine-learning model based on the user feedback; and causing, on the display of the user device, a presentation of the updated AI generated output.

20. The system of claim 1, wherein generating the first graphical user interface comprises:

querying the one or more databases based on the user query to retrieve a portion of the organizational data; and processing the portion of the organizational data to determine one or more interface parameters within the clock-in widget.

* * * * *